Aug. 4, 1942.  F. S. OVERACKER ET AL  2,291,982
ELECTROGAUGE SETUP BOARD
Filed July 12, 1941  2 Sheets-Sheet 1
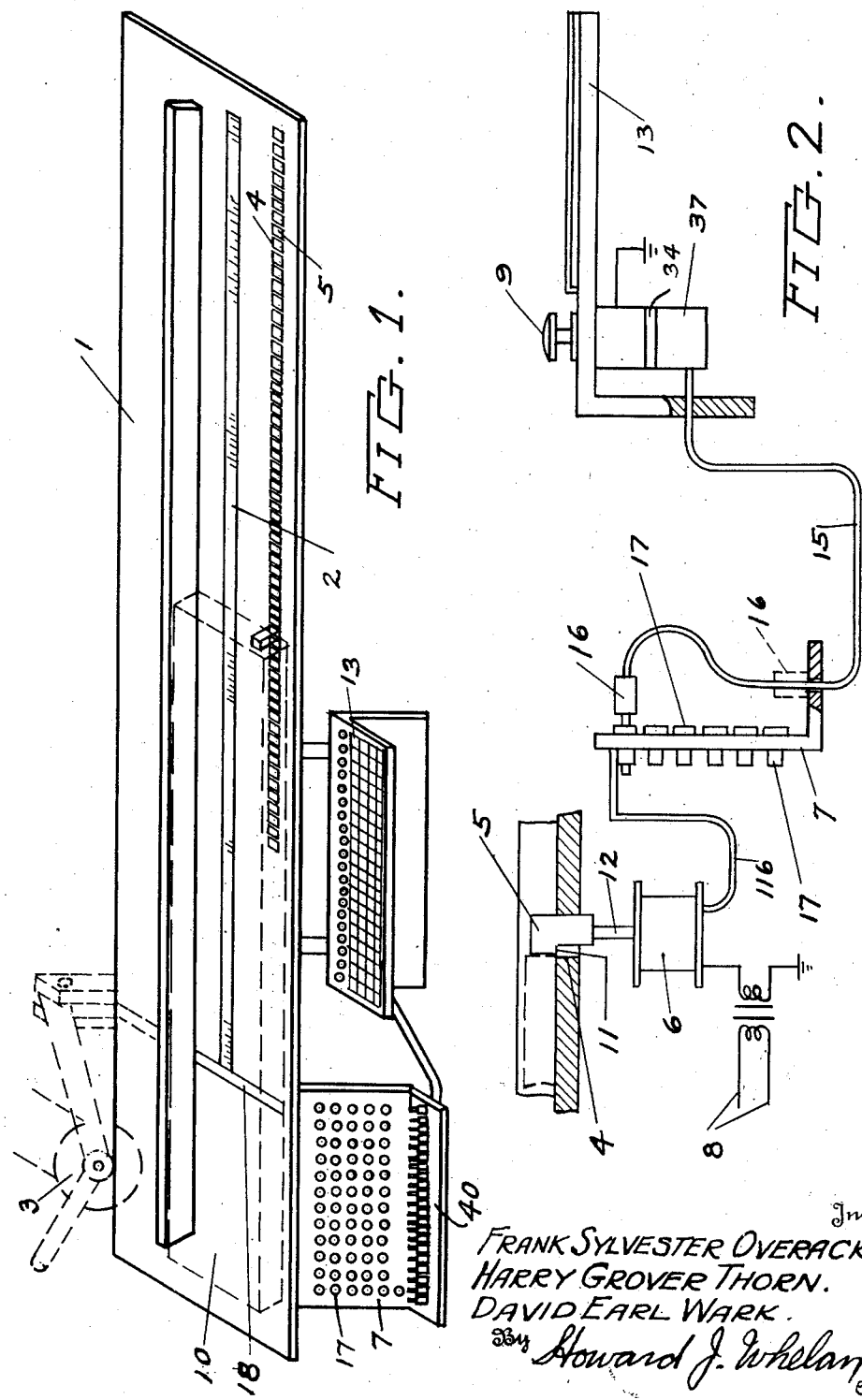
Inventors
FRANK SYLVESTER OVERACKER.
HARRY GROVER THORN.
DAVID EARL WARK.
By Howard J. Whelan
Attorney Aug. 4, 1942.   F. S. OVERACKER ET AL   2,291,982
ELECTROGAUGE SETUP BOARD
Filed July 12, 1941   2 Sheets-Sheet 2

Inventors
FRANK SYLVESTER OVERACKER.
HARRY GROVER THORN
DAVID EARL WARK.
By Howard J. Whelan.
Attorney Patented Aug. 4, 1942

2,291,982

UNITED STATES PATENT OFFICE 2,291,982

ELECTROGAUGE SETUP BOARD

Frank Sylvester Overacker, Harry Grover Thorn, and David Earl Wark, Klickitat, Wash.

Application July 12, 1941, Serial No. 402,064

1 Claim. (Cl. 143—168)

This invention refers to saw machines and more particularly to an electro-gauge adapted for use in cutting lumber, timber or rigid materials to definite sizes or dimensions. This is especially intended for use in factories where sash and door casings are cut from knotty lumber, which has been ripped to different widths. It has among its objects to make the setting of the machine or the materials thereon for cutting, quasi-automatic, so that individual measuring of each item will be eliminated to a great extent; and to have an arrangement for setting the material that its cutting operations will be expedited through at a high rate, due to the avoidance of detailed work in measuring off the work. Another object is to have the arrangement such that it will be neat, convenient and require very little manual effort to operate it. A further object is to have a push-button method for operating the measuring arrangements that is quick, accurate and attractive. Another purpose is to make the best possible use of the lumber selected or provided, and to do it easily, accurately and at a great saving of time over other methods.

Other objects will become apparent as the invention is more fully set forth.

The conventional method of measuring lumber and the like on saw tables requires the operator to use his hands, eyes and take careful steps to provide for the proper adjustment of the material and the guides used for cutting the latter. This consumes considerable time and effort and adds to the cost of production. In this invention, the operator has his work considerably facilitated and is able to do the cutting more effectively and accurately. A series of cables is brought from a set-up board having a list of the orders or cuts to be filled and plugged into a selected series of receptacles in the switch-board, these receptacles are connected to stops in the table, on which the materials are to be sawed through. The cables are connected with push-buttons which serve to switch on the circuits on the table and project stops on the table for controlling the material to be cut in such a manner as to have it of the proper size when sawed through. Each time a piece of lumber is sawed, the posts retaining it in position are released, automatically and the operator presses the next push-button to set the table for the next piece to be cut. When the operator proposes to saw a piece of material to a certain length, he presses the right button, causing the so-called stop to rise up at the proper distance. The stop stays up until the material is pressed against it and sawed off, then the stop automatically becomes released and drops down out of the way.

In the drawings, which indicate a form of the invention:

Figure 1 is a perspective view of a cutting table embodying this invention;

Figure 2 is a sectional elevation diagrammatically arranged of the push-button switch-board and stop mechanisms employed in Figure 1;

Similar reference characters refer to similar parts throughout the drawings.

Figure 3:
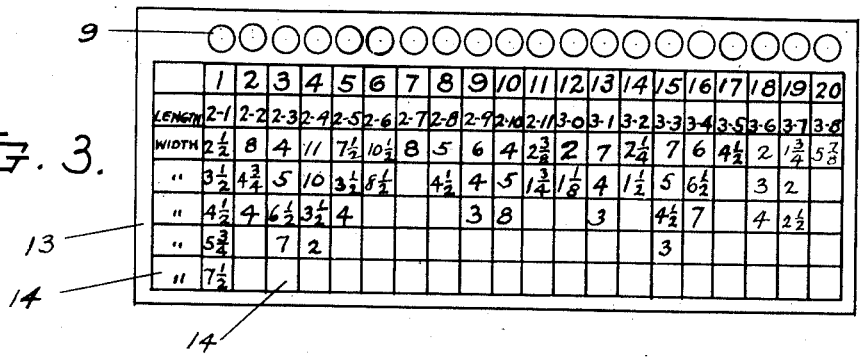
Figure 3 is a plan view of the set-up board of the mechanism indicated in Figure 1.
Figure 4:
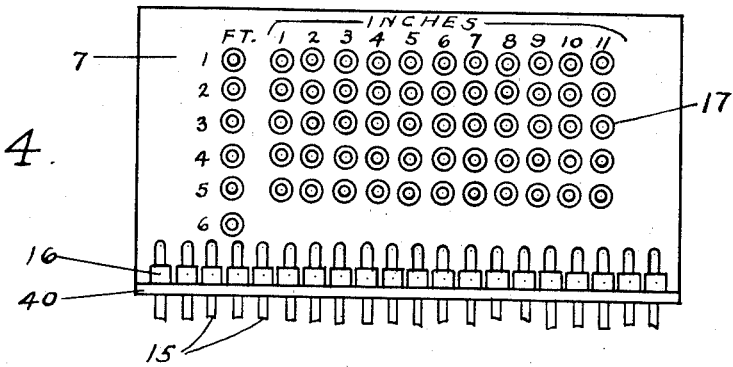
Figure 4 is a front elevation of the switch board and plugins used in the invention.
Figures 5, 6:
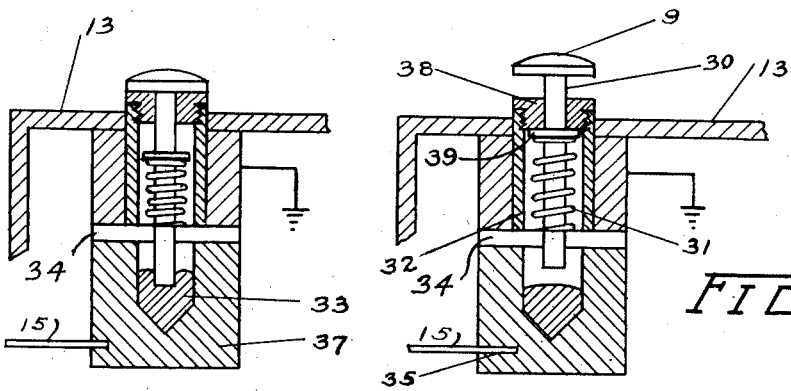
Figure 5 is a sectional elevation of the push button switch in closed position.
Figure 6 is a sectional elevation of the push-button switch in open position.

In the construction indicated, 1 represents a cutting table apportioned out with a graduated rule 2 to divide same into lengths or other forms as may be required. It has a conventional type of saw 3, adapted to swing and cut the material 10 placed upon the table, in the usual manner at the slot 18. This table is arranged with a series of rectangular orifices 4 through which so-called stops 5 project individually, when operated. These stops are operated through the use of magnet coils 6 energized through a source of electricity 8, switch-board 7, push-buttons 9. These stops are preferably arranged close or adjacent to each other in a straight line according to some selected unit of measurement, such as an inch, centimeter etc. When raised, the stops 5 serve as a restricting element to control the measurement and setting of the material 10 to be cut. In this instance the stops are used for measuring off the length of the material to be sawed off. The stops are raised by closing of their respective switches 9, as same become energized through their respective circuits and magnets. The stop is held in position by its ledge 11 extending over the top surface of the table thereby retaining same above the table level. The material to be cut, is pressed against the stop, pushing its ledge 11, off the table surface, but does not allow it to drop. The material 10, presses the side of the stop against the side of the orifices and frictionally prevents it dropping. After the material is sawed and removed, it allows the stop to retract under the tension of its supporting shaft 12, and thus permits it to return to its normal position, provided of course, the switch 9 is not closed.

The gauge or set-up board 13 used in the equipment consists of a chart marked off with lines 14 forming squares in which figures or lettering may be written. This board is shown marked from 1 to 20 inclusive, and has its series of push-buttons 9 attached thereon for the use of the operator. These push-buttons have cables 15 and plugs 16 that connect with the receptacles or sockets 17 on the interconnecting board in a conventional way. The switch or interconnecting board contains receptacles, each having a spring contact on the back. There being one receptacle for each saw stop, and each is connected by a wire 116 to the corresponding saw stop. Each receptacle on the switch-board is numbered in feet and inches according to the measure of the stop it is connected to. The ledge 40 contains 20 holes numbered from 1 to 20. Each hole holds a plug, which is connected by a wire to a push-button in the mercury gang switch, when one of these plugs is put in one of the receptacles it connects one of the push-buttons with one of the saw stops. There are many more stops and receptacles than push-buttons which allows great variation in the scope of operation of the same over the table. The attachment of the set-up and interconnecting boards are made through the use of bolts or other convenient means. This brings them in front of the table convenient to the work to be done.

The chart has been marked off in squares, the first row of squares contains the numbers from 1 to 20. The numbers are so spaced that when the chart is placed in front of the mercury gang switch on the set-up board, each number exactly corresponds to a push-button. In the squares below, the foreman writes the different cuts that he wants made to fill an order, for instance if be had on order some 2' 6" casing, but it specifically had to be cut from material 6 inches wide. He would write in, on the chart of the set-up board, in the first square below one of the numbers, 2' 6", and directly below in the next square he would write 6". The foreman writes in as many different measures, in this same way, as he wants cut at one time. When the cutter gets his set-up, or his order, he goes to the switch-board, and supporting the 2' 6" had been written under the number 1 on the set-up board, then he would take the number 1 plug and plug it in the hole marked 2' 6", and whatever length were written under number 2 he would put the number 2 plug into the hole for that length, and so on for the whole set-up. Then he takes the chart and puts it on the table in front of the push-buttons and is ready to go to work. The material 10 is then placed on the surface of the table and the push-button operated to make the respective stop rise above the table to control the position of the material to be cut. The bringing of the material against the stop assures that the saw will cut it for that length. Other lengths are provided for likewise. If the stops are 1" apart, and the first stop is for say 5 ft., then the other stops would be for 5'—1"; 5'—2" and so on depending on the number of the selected one from the first. In the case of twenty stops the last stop would register 6'—7". The operator simply presses the push-button down the proper number of times after each cut, to take care of the number required. Thus the first cut is done with the material pressing against the proper stop; then the material is brought against the stop for the next cut, so that the second width could be cut off; and so on until all the widths required are cut for that size. Then the next push-button would be operated for the next cutting. These cuttings are proceeded with in the same way. The proceeding would continue for all other sizes required on the list. When the list is completed, the chart for the set-up board is removed to the order department for more listings.

The push-buttons 9 are preferably made as indicated in the drawings, with a push-button top, a stem 30, a spring coil 31 for keeping it in tension out of contact; a shell 32, guide nut 38 and button structure 39 for holding it and protecting the parts, and a cup of mercury 33 into which the stem 30 immerses when the push button is pressed down to make the contact. The portion 34 is preferably of an insulating material to keep the circuit open except when the stem is pressed down. A hole 35 is provided in the cup structure 37 to take the cable 15 which connects the push-button and switch-board.

While but one general form of the invention is shown in the drawings, it is not desired to limit this application to the particular form or in any other way otherwise than limited by the scope thereof, as it is appreciated that other forms could be made that would use the same principles and come within the scope of the appended claim.

Having thus described the invention, what is claimed is:

In a saw machine, the combination of the table having its upper surface flat with slots therein, stops reciprocable in the slots, electrical means for operating the stops individually, circuit means for energizing the said means, a set-up board connected with the table having a surface for marking thereon the number of cuts to be made, a series of push-buttons for operating the circuit means and aligned with the markings in predetermined relation thereto.

FRANK SYLVESTER OVERACKER.
HARRY GROVER THORN.
DAVID EARL WARK.